(No Model.)

O. B. BOLTON.
COMBINED SAW STRETCHER AND SHEARS.

No. 566,651.  Patented Aug. 25, 1896.

Witnesses
G. W. Rea
Thos. A. Green

Inventor
Orrin B. Bolton
By Attorney
Edward Taggart

UNITED STATES PATENT OFFICE.

ORRIN B. BOLTON, OF GRAND RAPIDS, MICHIGAN.

COMBINED SAW STRETCHER AND SHEARS.

SPECIFICATION forming part of Letters Patent No. 566,651, dated August 25, 1896.

Application filed March 5, 1894. Serial No. 502,408. (No model.)

*To all whom it may concern:*

Be it known that I, ORRIN B. BOLTON, a citizen of the United States, residing at the city of Grand Rapids, in the county of Kent and State of Michigan, have invented a certain new and useful Combined Saw Stretcher and Shears, of which the following is a specification.

This invention relates to a new and useful device for stretching and straightening saws and at the same time shearing off the edge of the saw preparatory for a new set of teeth; and the invention consists in a set of stretchers mounted upon shafts parallel, or substantially parallel, to each other, together with a pair of roller-shears, which will shear the edge of the saw as the same is passed through the stretchers, thereby by one operation both stretching and shearing the saw, the object of the invention being to cheapen and facilitate the operation of stretching and shearing and making a more perfect operating-machine than those in ordinary use. These objects I accomplish by means of the mechanism illustrated in the accompanying drawings, in which—

Figure 1:
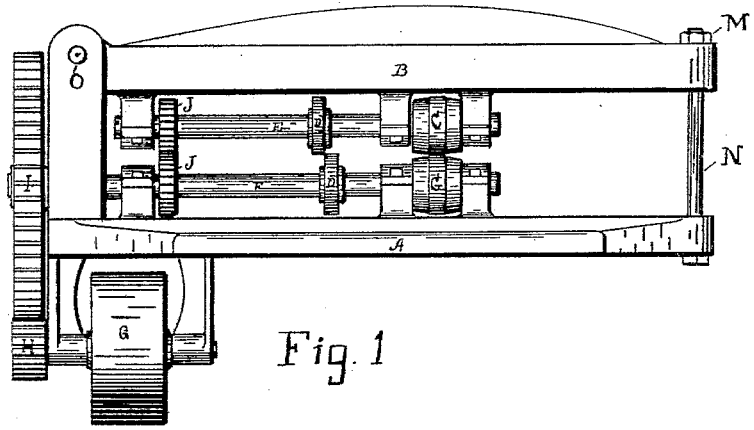
Figures 2, 3:
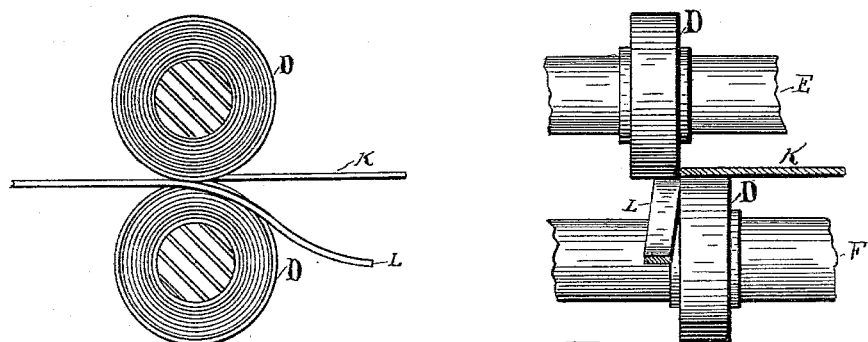

Figure 1 shows an elevation of a machine constructed in accordance with my invention. Fig. 2 shows an elevation of the shears with the saw in position, on an enlarged scale; and Fig. 3 shows a sectional view of Fig. 2 on the line where the revolving cutters sever the strip from the saw.

Similar letters refer to similar parts throughout the several views.

A represents the general framework of the machine, provided at one end with an upright support, to which is pivoted the frame B, the same being pivoted at the point O. A and B are respectively provided with lugs, in which are supported the shafts E and F, the shaft E being supported in lugs depending from B, and the shaft F being supported in lugs projecting from the main framework A. In the example of my invention shown in the drawings the power is applied through the band-wheel G, and through its shaft conveyed to the pinion H, thence to the spur-wheel I, and through the spur-wheel I to the shaft F. Upon the shaft F is a gear-wheel or gear J, engaging with a corresponding gear J on shaft E, thereby causing the two shafts E and F to revolve synchronously. The shears are shown by D D, the same being two revolving disks placed in such close proximity to each other that as the saw passes through the projecting edge will be severed, Figs. 2 and 3, K representing the main part of the saw and L the part which is cut off by means of the revolving shears.

C C represent the stretchers, which are composed of round wheels, preferably strengthened on either side, as shown in Fig. 1. These are friction-wheels and press the saw on either side.

The saw is placed between the rollers C C, which hold and strain the saw, and the saw also extends between the shears, so that a small portion of it is cut away as the saw is passed between the rollers C C and the shears D D. Thus the saw is not only stretched, but sheared at the same time and by the same operation.

N represents a bolt or rod provided with a nut or other suitable means for adjusting and retaining the upper frame B, which turns on pivot O, by means of which adjustment the saw can be inserted into the position above described and can be clamped, so that the rollers or wheels C C will strain the saw and move the same through between the rollers and also between the shears.

I have shown the shafts E and F as connected by means of the cog-wheels J J; but with the shafts E and F, the rolling shears D D, and the tighteners C C properly adjusted the saw may be carried through and sheared without the assistance of the cog-wheels J J, although I prefer the construction above described in order to give a more positive movement to the shafts E and F and the part supported thereon. In the place of the rod N and the nut M any suitable mechanical equivalent may be substituted for producing the same result.

Having thus described my invention, what I claim to have invented, and desire to secure by Letters Patent, is—

In a combined saw stretching and shearing machine, the combination of the parallel frames A, B, pivotally connected together at one end and at the other end adjustably connected together by a threaded bolt and nut, the shafts E and F journaled in hangers carried by the frames B, A, the stretching-rollers C, C, rigidly mounted on said shafts and having arc-shaped peripheries, means for positively driving said shafts and rollers in unison, and the overlapping shearing-disks rigidly mounted on said shafts in proximity to the stretching-rollers, whereby the saw is stretched and sheared at one operation, substantially as described.

In witness whereof I have hereunto set my hand and seal in the presence of two witnesses.

ORRIN B. BOLTON. [L. S.]

Witnesses:
EDWARD TAGGART,
CHRISTOPHER HONDELINK.